US 9,850,009 B2

(12) United States Patent
Verbin (10) Patent No.: US 9,850,009 B2
(45) Date of Patent: Dec. 26, 2017

(54) DEVICE, SYSTEM AND METHOD FOR ATTITUDE CONTROL

(71) Applicant: ISRAEL AEROSPACE INDUSTRIES LTD, Lod (IL)

(72) Inventor: Dov Verbin, Harrarit (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 126 days.

(21) Appl. No.: 14/651,632

(22) PCT Filed: Dec. 17, 2013

(86) PCT No.: PCT/IL2013/051030
§ 371 (c)(1),
(2) Date: Jun. 11, 2015

(87) PCT Pub. No.: WO2014/102770
PCT Pub. Date: Jul. 3, 2014

(65) Prior Publication Data
US 2016/0107769 A1     Apr. 21, 2016

(30) Foreign Application Priority Data
Dec. 26, 2012   (IL) .......................................... 223899

(51) Int. Cl.
*B64G 1/28*     (2006.01)
*G01C 19/30*    (2006.01)

(52) U.S. Cl.
CPC ............. *B64G 1/286* (2013.01); *G01C 19/30* (2013.01)

(58) Field of Classification Search
CPC ........ B64G 1/286; B64G 1/283; B64G 1/285; B64G 1/24; B64G 1/56; B64G 1/28; G01C 19/02; G01C 29/30; G01C 19/06
See application file for complete search history.

(56) References Cited

U.S. PATENT DOCUMENTS

| 3,741,500 A | 6/1973 | Liden |
| 6,047,927 A | 4/2000 | Heiberg et al. |
| 8,014,911 B2 | 9/2011 | Hamilton et al. |
| 2002/0145077 A1* | 10/2002 | Shultz ..................... B64C 17/06 244/79 |

(Continued)

FOREIGN PATENT DOCUMENTS

| KR | 2011 0134141 | 12/2011 |
| KR | 2012 0032248 | 4/2012 |

OTHER PUBLICATIONS

International Search Report and Written Opinion from International Application No. PCT/IL2013/051030 dated May 15, 2014.

*Primary Examiner* — Philip J Bonzell
(74) *Attorney, Agent, or Firm* — Dorsey & Whitney LLP (57) ABSTRACT

A control moment gyroscope (CMG) is provided, selectively having a first spatial configuration and a second spatial configuration at least during operation of the CMG. In the first spatial configuration the CMG occupies a smaller volume than in the second spatial configuration. For example, in the first spatial configuration no part of the CMG projects beyond a predetermined geometrical boundary, while in the second spatial configuration, a portion of the CMG projects beyond the geometrical boundary.

19 Claims, 6 Drawing Sheets

(56) References Cited

U.S. PATENT DOCUMENTS

2006/0102796 A1* 5/2006 Clark ................. B64G 1/56
                                                244/171.7
2010/0139440 A1* 6/2010 Rhee ................. G01C 19/30
                                                74/5 R

* cited by examiner

DEVICE, SYSTEM AND METHOD FOR ATTITUDE CONTROL

TECHNOLOGICAL FIELD

The presently disclosed subject matter relates to devices, systems and methods for attitude control, in particular to such devices in the form of control moment gyroscopes (CMG) and to attitude control systems incorporating such devices, particularly for use in space vehicles and the like.

BACKGROUND

Control moment gyroscopes (CMG) are devices used for attitude control, and often form part of an attitude control system (ACS) in space vehicles. ACS's can be used for maintaining a particular fixed orientation of the vehicle with respect to some desired datum, or for changing the attitude of the vehicle when required.

For example, CMG's are reportedly used in Digital-Globe's Worldview-1 and Worldview-2 satellites, and in the International Space Station. For example, Astrium and Rockwell Collins Deutschland provide CMG's for small satellites.

CMG's generally include a rotor spinning about an axis, while a gimbal tilts the rotor about a gimbal axis to change the direction of the angular momentum of the rotor. A gyroscopic torque is generated that results in the vehicle rotating, thereby changing its attitude. A controllable motor controls the tilt provided by the gimbal, and the speed of rotation of the rotor can be unchanged during tilting.

Some CMG's include a pair of gimbals to allow tilting about two orthogonal axes. Some CMG's spin the rotor at constant speed, while others spin the rotor at variable speeds, particularly during tilting of the rotor and are referred to as variable speed CMG's (VSCMG's).

References considered to be relevant as background to the presently disclosed subject matter are listed below:

U.S. Pat. No. 3,741,500 discloses an attitude control system for providing control torques on a vehicle, such as a space satellite, using four single gimbal control moment gyroscopes. The relatively simple constant-gain steering law permits three axis control after failure of any one of the four control moment gyroscopes.

U.S. Pat. No. 6,047,927 discloses control moment gyros in an array are rotated to reorient a satellite by an attitude signal. If the signal causes a gyro to have position that will produce a singularity in attitude control, a disturbance is introduced into the signal to avoid the singularity.

U.S. Pat. No. 8,014,911 discloses methods and systems for reorienting an agile vehicle, such as a satellite or spacecraft, using a control moment gyroscope (CMG) array. The CMG array comprises a plurality of CMGs onboard the agile vehicle. A disclosed method comprises obtaining an input torque command for reorienting the vehicle using the CMG array and, when the angular momentum of the CMG array violates or is approaching a momentum boundary criterion, decreasing the input torque command in the kinetic momentum direction, resulting in a modified torque command, and operating the CMG array using the modified torque command.

Acknowledgement of the above references herein is not to be inferred as meaning that these are in any way relevant to the patentability of the presently disclosed subject matter.

GENERAL DESCRIPTION

According to an aspect of the presently disclosed subject matter, there is provided a control moment gyroscope (CMG) configured for selectively having and/or assuming and/or adopting and/or providing and/or establishing, for example non-concurrently or alternately, a first spatial configuration and a second spatial configuration at least during operation of the CMG, wherein in said first spatial configuration said CMG occupies a smaller volume than in said second spatial configuration. For example, in said first spatial configuration no part or portion of said CMG projects beyond a predetermined geometrical boundary, and wherein in said second spatial configuration, a part or a portion of said CMG projects beyond said geometrical boundary.

According to this aspect of the presently disclosed subject matter, there is also provided a control moment gyroscope (CMG) configured for selectively providing each of a first spatial configuration and a second spatial configuration, alternately, at least during operation of the CMG, wherein in said first spatial configuration said CMG occupies a smaller volume than in said second spatial configuration. For example, in said first spatial configuration no part or portion of said CMG projects beyond a predetermined geometrical boundary, and wherein in said second spatial configuration, a part or a portion of said CMG projects beyond said geometrical boundary.

According to this aspect of the presently disclosed subject matter, there is also provided a control moment gyroscope (CMG) configured for selectively and alternately providing a first spatial configuration and a second spatial configuration at least during operation of the CMG, wherein in said first spatial configuration no part or portion of said CMG projects beyond a predetermined geometrical boundary, and wherein in said second spatial configuration, a part or a portion of said CMG projects beyond said geometrical boundary. For example, in said first spatial configuration said CMG occupies a smaller volume than in said second spatial configuration.

Optionally, each of the above CMG comprises a variable external envelope enclosing a variable volume, wherein in said first spatial configuration said variable volume is smaller than in said second spatial configuration. The external envelope can be defined as a geometrical surface that includes and coincides with externally-facing portions of the CMG and concurrently encloses all of the CMG, and thus defines the external shape of the CMG. According to this aspect of the presently disclosed subject matter, the outer shape of the CMG is variable, and in the said first spatial configuration said CMG has a smaller shape (when viewed form a particular direction, for example from the side) and occupies a smaller volume than in said second spatial configuration.

Additionally or alternatively, the CMG comprises a rotor assembly pivotably mounted to a housing defining a vehicle interface, wherein in said first spatial configuration said rotor assembly is inwards of said vehicle interface (for example said rotor assembly is fully enclosed in the housing or is fully located on the inward side of the vehicle interface), and wherein in said second spatial configuration at least a part of said rotor assembly projects outwards of said vehicle interface (for example part of said rotor assembly is not enclosed in the housing or part of said rotor assembly is not located on the inward side of the vehicle interface). For example, said vehicle interface comprises an opening, and wherein in said first spatial configuration said rotor assembly is inwards of said opening, and wherein in said second spatial configuration at least a part of said rotor assembly projects outwards beyond said opening. Additionally or alternatively, said rotor assembly comprises a rotor element rotatably mounted about a spin axis to a gimbal, and said gimbal is rotatably mounted to said housing for selective controlled rotation of the rotor assembly about a gimbal axis with respect to said housing. For example, said gimbal axis is orthogonal to said spin axis. Additionally or alternatively, said gimbal axis intersects the rotor element. Additionally or alternatively, the gimbal comprises a gimbal frame rotatably mounted to said housing, and wherein the rotor element is rotatably mounted to said gimbal frame. For example, said gimbal frame comprises a rotor base onto which said rotor element is rotatably mounted, and wherein said rotor base is displaced away from said gimbal axis by a spacing.

Alternatively, said rotor assembly comprises a rotor element rotatably mounted about a spin axis to a first gimbal, said first gimbal is rotatably mounted to a second gimbal about a first gimbal axis, and said second gimbal is rotatably mounted to said housing for selective controlled rotation of the rotor assembly about a second gimbal axis with respect to said housing, for selective controlled rotation of the rotor assembly about each one of said first gimbal axis and said second axis with respect to said housing. For example, said first gimbal axis, said second gimbal axis, and said spin axis are mutually orthogonal.

Additionally or alternatively, said vehicle interface is at or inwards of said predetermined geometrical boundary.

Additionally or alternatively, the CMG further comprises a shroud for said rotor assembly, said shroud being configured for pivoting with said rotor assembly about said gimbal axis. For example, said shroud is configured for providing at least one of thermal protection and mechanical protection to said rotor assembly. For example, said shroud is additionally or alternatively made from, or comprises, or is covered with, a thermal insulating material. For example, said shroud is additionally or alternatively made from, or comprises, or is covered with, a mechanical shielding material. For example, said shroud is additionally or alternatively made from, or comprises, or is covered with, a micrometeorite shielding material. Such materials are known in the art.

Additionally or alternatively, the CMG further comprises a cover configured for selectively providing each one of an undeployed configuration and a deployed configuration, wherein in said first spatial configuration said cover is in the undeployed configuration, and wherein in said second spatial configuration said cover is in the deployed configuration. For example, said cover comprises a flexible skin and a rib structure, wherein said rib structure is configured for changing from a compact form to a projecting form, to enable the cover to selectively adopt said deployed configuration and said undeployed configuration. In another example, said cover comprises a resilient skin configured for changing from a compact form to a projecting form, to enable the cover to selectively adopt said deployed configuration and said undeployed configuration. In another example, said cover comprises a plurality of nested telescopic elements configured for telescopically extending to a projecting form and for telescopically retracting to provide a compact form, to enable the cover to selectively adopt said deployed configuration and said undeployed configuration. In the deployed configuration, said cover defines an internal volume sufficient for enabling the CMG to assume or adopt said second spatial configuration, while in the undeployed configuration, said cover defines an internal volume insufficient for enabling the CMG to assume or adopt said second spatial configuration, but sufficient for enabling the CMG to assume or adopt said first spatial configuration.

For example, said cover is configured for at least one of thermally protecting and mechanically protecting said CMG or part thereof. For example, said cover is additionally or alternatively made from, or comprises, or is covered with, a thermal insulating material. For example, said cover is additionally or alternatively made from, or comprises, or is covered with, a mechanical shielding material. For example, said cover is additionally or alternatively made from, or comprises, or is covered with, a micrometeorite shielding material. Such materials are known in the art.

For example, said cover is configured for locking in said deployed configuration, and thus remains locked in said deployed configuration after deployment from said undeployed configuration.

Additionally or alternatively, the CMG is configured to be installed in a vehicle and wherein said predetermined geometrical boundary is associated with the vehicle, and wherein said vehicle interface is configured to be within said predetermined geometrical boundary, such that in said first spatial configuration said rotor assembly is inwards of said geometrical boundary, and wherein in said second spatial configuration at least a part of said rotor assembly can project outwards beyond said geometrical boundary. For example, said geometrical boundary is a payload envelope associated with the vehicle.

According to this aspect of the presently disclosed subject matter, there is also provided an attitude control system comprising at least one control moment gyroscope or an array of control moment gyroscopes, wherein at least one said control moment gyroscope is the CMG as defined above for this aspect of the presently disclosed subject matter.

For example, the attitude control system comprises one said CMG. Optionally, the attitude control system is configured for providing smooth control of a line of sight (LOS) of a space vehicle with respect to the surface of the Earth.

For example, the attitude control system comprises two said CMG's. Optionally, the attitude control system is configured for providing attitude maneuvering for space vehicle with respect to two orthogonal spatial axes.

For example, the attitude control system comprises three said CMG's. Optionally, the attitude control system is configured for providing attitude maneuvering for space vehicle with respect to three orthogonal spatial axes.

For example, the attitude control system comprises four or more said CMG's. For example, at least three of said four or more said CMG's are configured for providing attitude maneuvering for space vehicle with respect to three orthogonal spatial axes.

According to this aspect of the presently disclosed subject matter, there is also provided a vehicle comprising an attitude control system (ACS) as defined above for this aspect of the presently disclosed subject matter. For example, said vehicle is a space vehicle. For example, said vehicle is any one of a space probe, a missile, a reentry vehicle or capsule, a space station, and a satellite.

For example, the vehicle comprises an external configuration optimized for being enclosed within a respective payload envelope, wherein in said first spatial configuration the respective said one or more CMG are enclosed within said payload envelope, and wherein in said second spatial configuration parts of one or more of the respective said one or more CMG project outside of said payload envelope.

According to this aspect of the presently disclosed subject matter, there is also provided a vehicle comprising an external geometrical envelope, and further comprising at least one control moment gyroscope (CMG) configured for selectively providing each one of a first spatial configuration and a second spatial configuration at least during operation of the CMG, wherein in said first spatial configuration said CMG occupies a smaller volume than in said second spatial configuration. For example the CMG can be the CMG as defined above for this aspect of the presently disclosed subject matter.

According to this aspect of the presently disclosed subject matter, there is also provided a vehicle comprising an external geometrical envelope, and further comprising at least one control moment gyroscope (CMG) configured for selectively and alternately providing a first spatial configuration and a second spatial configuration at least during operation of the CMG, wherein in said first spatial configuration no part of said CMG projects beyond said external geometrical envelope, and wherein in said second spatial configuration, a portion of said CMG projects beyond said external geometrical envelope. For example the CMG can be the CMG as defined above for this aspect of the presently disclosed subject matter.

According to this aspect of the presently disclosed subject matter, there is also provided method for controlling a spatial attitude of a vehicle, comprising providing an ACS as defined above for this aspect of the presently disclosed subject matter and operating at least one CMG thereof between a respective said first spatial configuration and a respective said second spatial configuration.

For example, the ACS is provided in a vehicle. For example, the vehicle is a space vehicle. For example, the vehicle is any one of a space probe, a space station, a missile, a reentry vehicle or capsule, and a satellite.

For example, the ACS is operated to provide smooth control of a line of sight (LOS) of the vehicle with respect to the surface of the Earth. The ACS can include one or more CMGs, and for example, at least one CMG can be a CMG as defined above for this aspect of the presently disclosed subject matter.

Additionally or alternatively, the ACS is operated to provide attitude maneuvering for the vehicle with respect to two orthogonal spatial axes. For example, the ACS can include two or more CMGs (having a single gimbal axis) or at least one CMG (having two gimbal axes). For example, at least one CMG can be a CMG as defined above for this aspect of the presently disclosed subject matter.

Additionally or alternatively, the ACS is operated to provide attitude maneuvering for the vehicle with respect to three orthogonal spatial axes. For example, the ACS can include three or more CMGs, for example three or more CMGs having a single gimbal axis, or at least two CMG each having two gimbal axes, or one or more CMGs having a single gimbal axis plus at least one CMG having two gimbal axes. For example, at least one CMG can be a CMG as defined above for this aspect of the presently disclosed subject matter.

A feature of at least one example according to this aspect of the presently disclosed subject matter is that the respective CMG can be configured having a particularly compact configuration. Another feature is that such a compact configuration allows the CMG to be located on a vehicle (for example a space vehicle) such to enable maximizing use of the available volume defined by the respective payload envelope. For example, the CMG can be designed to maximize use of this available volume by having a respective rotor element that is larger than would be possible if all of the CMG would be required to be within the payload envelope even when at the second pivot position, and no projection of the rotor assembly beyond the payload envelope were to be allowed at the second pivot position. Alternatively, the CMG can be designed having a respective rotor element that is the same size as would be possible if all of the CMG would be required to be within the payload envelope even when at the second pivot position, and no projection of the rotor assembly beyond the payload envelope were to be allowed at the second pivot position; however, the CMG can be closer to the payload envelope so that in fact in the second pivot position part of the rotor assembly projects outwardly of the payload envelope, thereby freeing up more space within the payload envelope.

Herein, "operation" of the CMG refers to at least where the CMG is assembled and functional, and capable of providing control moments responsive to receiving control signals thereto on command (independently of, i.e., setting aside, any requirement to conform to a geometrical envelope such as for example the payload envelope), for example from a suitable controller, and is thus able to pivot at least between the first pivot position and the second pivot position, to provide these control moments. Alternatively or additionally, operation of the CMG refers herein to at least where the CMG is assembled and functional, and is installed in a vehicle, or is in condition to be installed into a vehicle, and is ready for use to provide control moments to the vehicle.

BRIEF DESCRIPTION OF THE DRAWINGS

In order to better understand the subject matter that is disclosed herein and to exemplify how it can be carried out in practice, examples will now be described, by way of non-limiting example only, with reference to the accompanying drawings, in which:

FIGS. 3(a) to 3(c) illustrate in cross-sectional side view the example of the control moment gyroscope of FIG. 1 in which respectively: FIG. 3(a)—the cover is in the undeployed configuration and the control moment gyroscope is in its first spatial configuration; FIG. 3(b)—the cover is in the deployed configuration and the control moment gyroscope is in its first spatial configuration; FIG. 3(c)—the cover is in the deployed configuration and the control moment gyroscope is in its second spatial configuration.

FIGS. 4(a) to 4(c) illustrate in cross-sectional side view an alternative variation of the example of the control moment gyroscope of FIG. 1 comprising a telescopic cover, and in which respectively: FIG. 4(a)—the telescopic cover is in the undeployed configuration and the control moment gyroscope is in its first spatial configuration; FIG. 4(b)—the telescopic cover is in the deployed configuration and the control moment gyroscope is in its first spatial configuration; FIG. 4(c)—the telescopic cover is in the deployed configuration and the control moment gyroscope is in its second spatial configuration.

DETAILED DESCRIPTION

Figure 1:
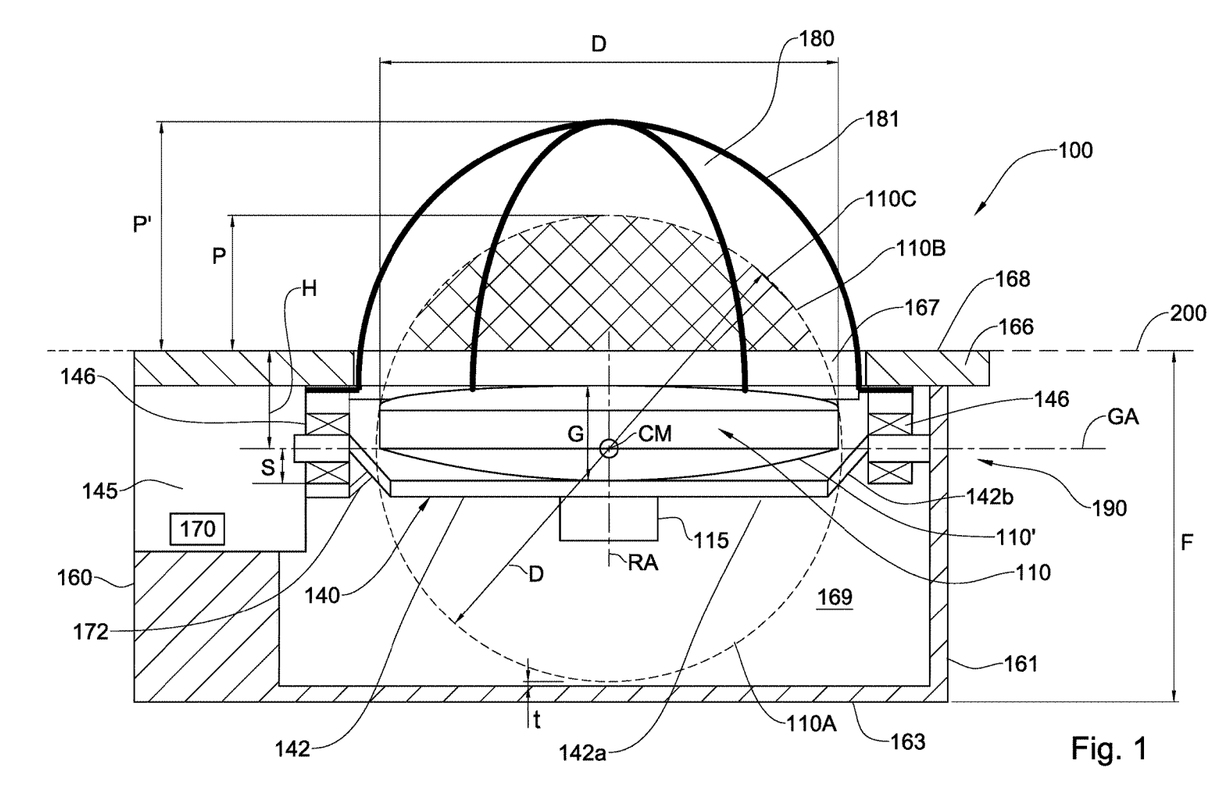
FIG. 1 illustrates in cross-sectional side view an example of a control moment gyroscope according to an aspect to the presently disclosed subject matter.

Referring to FIG. 1, an example of a control moment gyroscope (CMG), generally designated 100, according to an aspect of the presently disclosed subject matter, comprises a rotor assembly 190 rotatably mounted to housing 160. The rotor assembly 190 comprises a rotor element 110 rotatably mounted to a gimbal system 140 about rotor spin axis RA, and gimbal system 140 is in turn rotatably mounted to the housing 160 about gimbal axis GA.

Rotor motor 115, mounted to the gimbal system 140, is provided for controllably spinning rotor element 110 about rotor spin axis RA. While in this example the rotor element 110 is spun at constant speed during operation of the CMG 100, in alternative variations of this example the rotor element 110 can be spun at a controllably variable speed during operation of the respective CMG. In any case, the rotor element 110 has a rotor diameter D, and a moment of inertia when spun about rotor spin axis RA at a particular desired angular speed for operation thereof.

In this example, gimbal system 140 is configured for controllably tilting the rotor assembly 190 including rotor element 110 about a single gimbal axis GA, different from the rotor spin axis RA and in particular orthogonal to the rotor spin axis RA, to enable tilting of the rotor about one of azimuth and elevation. For example, the gimbal system 140 comprises a gimbal frame 142, journalled to bearings 146 mounted to the housing 160 or part thereof. The gimbal system 140 is controllably driven via gimbal motor 145. Thus, in this example, the rotor element 110 is rotatably mounted to a gimbal system 140 at the frame 142.

Housing 160 includes an inwardly projecting cavity 169, defined by side walls 161 and base 163. The cavity 169 projects inwardly from the opening 167, and particularly from the vehicle interface 166 or surface 168, by a depth F.

The cavity 169 is configured for allowing the frame 142 (and thus, together with the rotor element 110, the rotor assembly 190) to be rotated about gimbal axis GA a full 360° (or at least ±90° from the 0° position illustrated at 110' in FIG. 1) without fouling or making other physical contact between the rotor element 110 and/or gimbal system 140 (or any other part of the rotor assembly 190) with the housing 160, in particular side walls 161 and base 163.

Thus, for example, when rotor assembly 190 is pivoted or rotated about gimbal axis GA (via the gimbal system 140) from a first pivot position (the 0° position) shown at 110' in FIG. 1 by +90° or −90° to a second pivot position shown by the dotted line 110A, which represents the closest position of the rotor element 110 to the base 163, there is still a clearance or spacing t between the rotor element 110 and the base 163.

The first pivot position can be defined as the most compact position with respect to the housing 160, for example a pivot position in which no part of the rotor assembly 190 projects outwardly with respect to the housing 160 or the cavity 169, and thus all of the rotor assembly 190 is enclosed within the housing 160 or the cavity 169. The second pivot position can be defined in general as any pivot position other than the first pivot position. More particularly second pivot position can be defined as any pivot position in which part of the rotor assembly 190 projects with respect to housing 160, and thus not all of the rotor assembly 190 is enclosed within the housing 160 or the cavity 169. More particularly, the second pivot position can be defined as the pivot position corresponding to the maximum projection of the projecting part of the rotor assembly 190 with respect to housing 160. For example, the first pivot position can be angularly displaced from the second pivot position by up to and including +90° or −90°.

The housing 160 further comprises an upper end including a vehicle interface 166, and an aperture or opening 167 into said cavity 169. The vehicle interface 166 comprises an upper surface 168. It is to be noted that when the rotor assembly 190 is rotated or pivoted from the first pivot position shown in FIG. 1 at 110 by +90° or −90° to the second pivot position, another part of the rotor element 110 projects beyond the opening 167 and in particular projects beyond the upper surface 168 to what is schematically shown by the dotted line 110B. This projecting part is schematically illustrated by the shaded area 110C, bounded between dotted line 110B and the opening 167.

Figure 2:
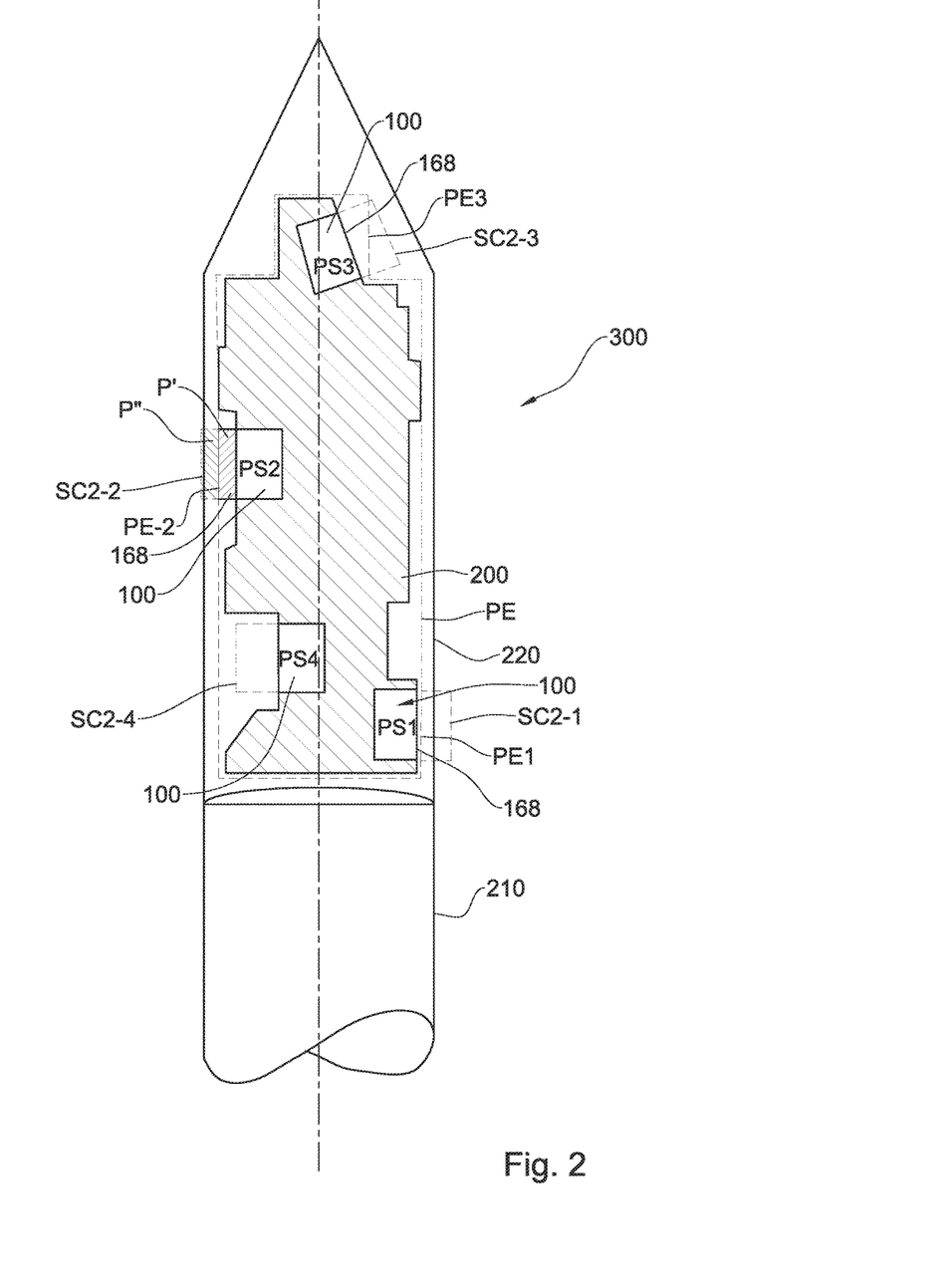

Vehicle interface 166 is configured for affixing the CMG 100 to an external structure, such as for example a vehicle 200, schematically illustrated in FIG. 2. For example, the vehicle interface 166 can be in the form of a mounting bracket or the like. Thus, vehicle interface 166 can comprise any suitable fixing system, for example mounting or engagement mechanisms or devices that are configured to mount, engage or otherwise affix the CMG 100 to the external structure, e.g. the aforesaid vehicle 200. Such fixing systems can include for example screws, braces, straps, and so on, and many examples of such fixing systems are known in the art. In alternative variations of this example of the CMG, the housing 160 omits side walls 161 and base 163, and cavity 169 is instead defined by a volume inwardly projecting from the opening 167.

In this example, the gimbal frame 142 has a rotor base 142a, onto which the motor 115 and the rotor element 110 are mounted on opposed sides thereof, although in alternative variations of this example the motor 115 can be partially or fully enclosed in the rotor element 110, and/or the motor 115 is on the same side of the rotor base 142a as the rotor element 110. In any case, the rotor base 142a is displaced away from the gimbal axis GA by spacing S via arms 142b that connect the rotor base 142a to the bearings 146. The rotor element 110 has a height G from the rotor base 142a, height G being taken along a direction parallel to the rotor axis RA.

In this example, the center of mass CM of the rotor assembly 190 is aligned with the rotor axis RA and with the gimbal axis GA, and is located within the rotor element 110, and thus the gimbal axis GA intersects the rotor element 110. However, in alternative variations of this example, the center of mass CM of the rotor assembly 190 can be offset with respect to the gimbal axis GA. For example, such an offset can be in a direction parallel to the rotor axis RA.

The gimbal axis GA is spaced from the vehicle interface 166, in particular from the opening 167, by a spacing H, in an inwardly direction.

The spacing S allows at least a portion of the rotor assembly 190 to be displaced inwardly from the opening 167, when in the first pivot position. For a given rotor height G, the larger the spacing S, the more the rotor element 110 is displaced away from opening 167 at the first pivot position 110', and thus at a particular spacing S all of the rotor element 110 is in the cavity 169, and inwardly of opening 167 at the first pivot position 110'. On the other hand, the larger the spacing S, the more that the gimbal system 140 projects in an outwardly direction when the rotor assembly 190 is pivoted by 180° from the first pivot position. Thus if S is large relative to spacing H, the rotor assembly 190 could possibly project out of the opening 167 when the rotor assembly 190 is pivoted by 180° from the first pivot position, depending on the rotor height G.

A compact configuration for the CMG 100 can be provided by:

minimizing the depth F required for at least the aforesaid second position of the rotor assembly 190, while concurrently maximizing the projection 110C, for a given rotor element diameter D; and at the same time ensuring that no part of the rotor assembly 190 in general, and of the rotor element 110 in particular, projects beyond the opening 167 at the aforesaid first position of the rotor assembly 190.

To provide such a compact configuration, the CMG 100 can be configured to optimize one or more geometrical parameters thereof, for example as follows:

(a) The geometrical parameter spacing H can be minimized as much as possible by minimizing the size of the bearings 146 and/or having the bearings 146 as close as possible to the vehicle interface 166, while still ensuring that no part of the rotor assembly 190 in general, and of the rotor element 110 in particular, projects outside beyond the opening 167 at the first pivot position 110'.

(b) Additionally or alternatively, the geometrical parameter height G can be minimized for a given desired operating moment of inertia I, while still ensuring that no part of the rotor assembly 190 in general, and of the rotor element 110 in particular, projects outside beyond the opening 167 at the first pivot position 110'.

(c) Additionally or alternatively, the geometrical parameter spacing S is optimized to maximize the projection 110C in the aforesaid second pivot position 110A, while ensuring that in the first pivot position (and/or, at 180° thereof about the gimbal axis GA), no part of the rotor assembly 190 in general, and of the rotor element 110 in particular, projects beyond the opening 167.

In operation of the CMG 100, the CMG 100 can be already mounted to a vehicle, for example vehicle 200, and is ready for use to enable the vehicle to be mounted into the respective payload bay and to subsequently provide control moments as required after the vehicle is released from the payload bay. A suitable controller 170 controls operation of the CMG. In particular controller 170 operates by controlling the motor 115 to selectively spin the rotor element 110 about rotor spin axis RA at a constant or variable speed, and by controlling the gimbal motor 145 to pivot the rotor assembly 190 about a desired pivot angle to controllably change the direction of the angular momentum of the rotor element 110. The change in angular momentum of the rotor element 110 generates a gyroscopic torque that results in the vehicle 200 rotating, thereby changing its attitude. Such pivoting of the rotor assembly 190 can vary at least between the first pivot position 110' and the second pivot position 110A, for example.

Figure 1A:
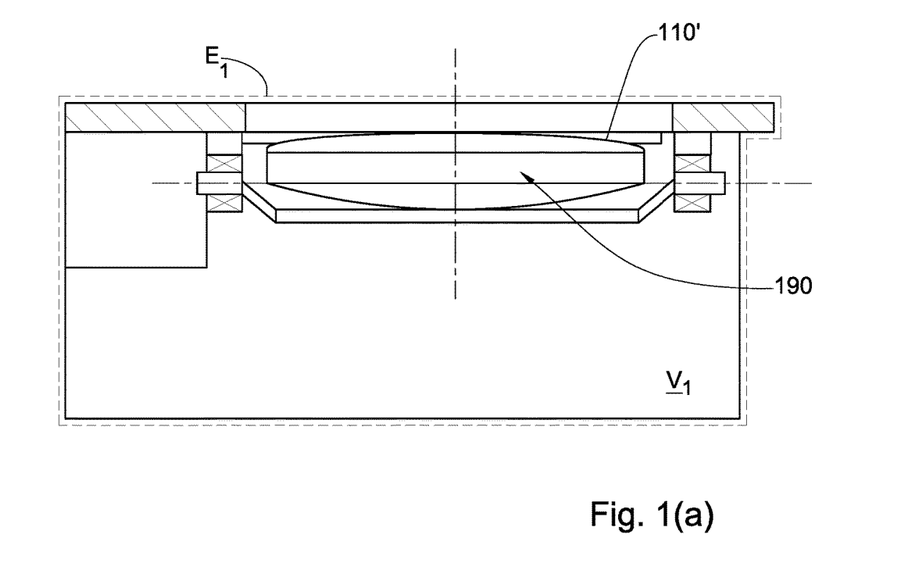
FIG. 1(a) illustrates an alternative variation of the example of FIG. 1 without the cover and in a first spatial configuration.
Figure 1B:
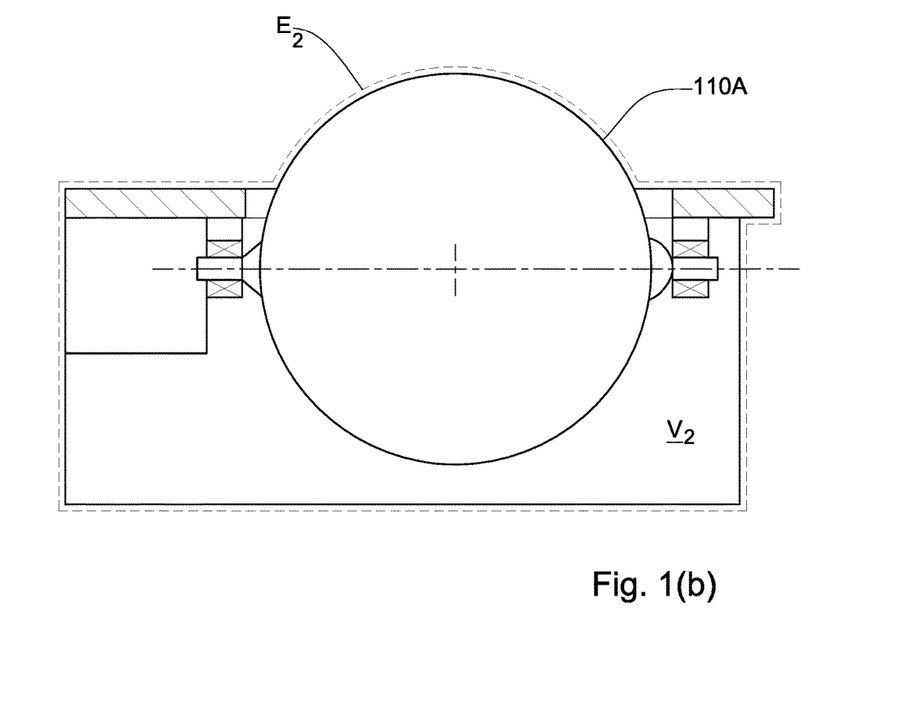
FIG. 1(b) illustrates an alternative variation of the example of FIG. 1 without the cover and in a second spatial configuration.

Referring also to FIGS. 1(a) and 1(b), it is clearly evident that the CMG 100 is configured for selectively and alternately providing a corresponding first spatial configuration and for selectively and alternately providing a corresponding second spatial configuration (the first spatial configuration and the second spatial configuration respectively corresponding to the first pivot position 110' and the second pivot position 110A, for example), at least during operation of the CMG. In other words, the CMG 100 is configured for selectively alternating (at least once) between the first spatial configuration and the second spatial configuration at least during operation of the CMG.

Herein, "operation" of the CMG 100 refers to at least where the CMG 100 is capable of providing control moments responsive to receiving control signals thereto on command (independently of, i.e., setting aside, any requirement to conform to a geometrical envelope such as for example the payload envelope), for example from a suitable controller, and is thus able to pivot at least between the first pivot position 110' and the second pivot position 110A, to provide these control moments. Alternatively or additionally, operation of the CMG 100 refers herein to at least where the CMG 100 is installed in a vehicle, or is in condition to be installed into a vehicle, and is ready for use to provide control moments to the vehicle.

Thus, the CMG 100 has a spatial configuration that is variable between the first spatial configuration and the second spatial configuration, and this spatial configuration depends on the pivot position (i.e., angular disposition) of the rotor assembly 190 with respect to gimbal axis GA. This variable spatial configuration can be defined as the effective volume V occupied by the CMG 100 that is variable between a first volume V1 and a second volume V2, and/or, as a geometrical external envelope that is as close as possible to externally-facing portions of the CMG 100 and concurrently encloses all of the CMG 100, the external envelope being variable between a first external envelope E1 and a second external envelope E2.

Thus, and referring to FIG. 1(a), when the rotor assembly 190 is in the aforesaid first pivot position 110', the CMG 100 adopts the first spatial configuration, occupying first volume V1 enclosed by first external envelope E1. Referring to FIG. 1(b), when the rotor assembly 190 is in the aforesaid second pivot position 110A, the CMG 100 adopts the second spatial configuration, occupying volume V2 enclosed by second external envelope E2.

It is clearly evident that the first spatial configuration is different from the second spatial configuration. In particular, volume V1 is smaller than volume V2, and thus in the first spatial configuration the CMG 100 occupies a smaller volume than in the second spatial configuration. Said differently, volume V2 is larger than volume V1, and thus in the second spatial configuration the CMG 100 occupies a larger volume than in the first spatial configuration.

Similarly, the volume enclosed by first external envelope E1 is smaller than the volume enclosed by second external envelope E2, and thus in the first spatial configuration the variable volume occupied by the external envelope is smaller than in the second spatial configuration. Said differently, the volume enclosed by second external envelope E2 is larger than the volume enclosed by first external envelope E1, and thus in the second spatial configuration the variable volume occupied by the external envelope is larger than in the first spatial configuration.

It is also clearly evident that the outer shape of the CMG 100, as defined by the variable external envelope, in the first spatial configuration is different from the outer shape of the CMG 100 in the second spatial configuration. In other words, the outer shape of first external envelope E1 is different from the outer shape of the second external envelope E2. Thus, outer shape of the CMG 100 is variable, and in the said first spatial configuration the CMG 100 has a smaller shape (when viewed form a particular direction, for example in side view illustrated in FIGS. 1(a) and 1(b)) and occupies a smaller volume than in the second spatial configuration.

The spatial or geometrical difference between first volume V1 and second volume V2, or indeed between first external envelope E1 and second external envelope E2, arises due to the CMG 100 being configured to allow part 110C of the rotor element 110 to selectively project beyond casing 190 to an outside thereof, in particular to selectively project beyond one or more of: opening 167, vehicle interface 166 and surface 168. In turn, this feature allows the CMG 100 to selectively and alternately provide a particularly compact configuration, corresponding to the aforesaid first pivot position 110' of the rotor assembly 190, relative to other configurations that correspond to at least some other pivot positions of the rotor assembly 190 up to and including the aforesaid second pivot position 110A the rotor assembly 190.

Such a particularly compact configuration can be useful, for example, in applications in which the CMG 100 is required to be installed in a vehicle, for example vehicle 200, having particular geometrical constraints, which geometrical constraints are nevertheless variable. For example, and referring again to FIG. 2, vehicle 200 can constitute or can be part of a space vehicle, for example a space probe, a space station, a satellite, and so on. Vehicle 200 can be further configured to be launched via a payload bay of a carrier vehicle, for example a launcher 210 or any other suitable means, and is required to be accommodated in a respective payload bay that defines a payload envelope PE. For example, the payload bay can be defined within a payload fairing 220, for example an aerodynamic and/or environmental fairing. The fairing 220 envelopes and protects the vehicle 200 during the launch phase, and is jettisoned when no longer needed, for example when the vehicle 200 has attained a particular altitude above the Earth.

Alternatively, for example, vehicle 200 can be further configured to be launched via a payload bay of a reusable carrier vehicle, such a space shuttle or the like for example, and is similarly required to be accommodated in the respective payload bay that also defines a respective payload envelope. For example, the payload bay comprises access doors, which are closed and protect the vehicle 200 during the launch phase, after which the doors can be opened for example when the vehicle has attained a particular altitude above the Earth, and the vehicle deployed or launched from the carrier vehicle.

Accordingly, certain geometrical constraints are imposed on the vehicle 200 for the launch phase, for example, including the geometrical constraint that no part of the vehicle 200 can project beyond or outside of the payload envelope PE, the payload envelope PE being defined with respect to the payload bay, as is known in the art. At the same time, once the respective fairing is jettisoned or the payload bays opened, for example, such a geometrical constraint is no longer needed. The payload envelope PE thus represents a predetermined geometrical boundary.

According to this aspect of the presently disclosed subject matter, the CMG 100 can be mounted to the vehicle 200 at any desired location, with the external surface 168 thereof being at any position within and up to as close as possible to payload envelope PE without projecting past the payload envelope at the respective first spatial position of the CMG 100. In such a location, the CMG 100 is in the aforesaid particularly compact configuration, corresponding to the aforesaid first pivot position 110' of the rotor assembly 190, and thus all parts thereof are inside the payload envelope PE. The CMG 100 remains in the aforesaid particularly compact configuration from at least the time that the vehicle 200 is installed in the payload bay, and continues during all the pre-launch phases of the vehicle, i.e., while the vehicle 200 is required to comply with the aforesaid geometrical constraint. For this purpose, lock 172 can be provided to lock the rotor assembly 190 with respect to the housing 160 at the aforesaid first pivot position 110'. Once the geometrical constraint regarding the payload envelope is removed, for example after the fairing 220 is jettisoned, the lock 172 is deactivated or otherwise unlocked, allowing the CMG 100 to operate, enabling the rotor assembly to rotate to any desired pivot position, allowing selectively controllably changing the angular momentum of the rotor element 110 to generate a gyroscopic torque. In doing so, the rotor assembly 190 can be pivoted to the second pivot position 110A or close thereto, thereby allowing the rotor element 110 to project past the opening 167, and also to project through the payload envelope PE during operation thereof.

FIG. 2 illustrates schematically a number of different locations for CMG 100 with respect to the vehicle 200 and payload envelope PE.

In position PS1, the outer surface 168 of CMG 100 is very close to or coincides with a respective portion PE1 of the payload envelope PE. In the respective first spatial configuration all of the CMG 100 is within the payload envelope PE, i.e., no part of the CMG 100 projects beyond the predetermined geometrical boundary in the form of the payload envelope PE. On the other hand, in the respective second spatial configuration, indicated by the dotted line SC2-1, indicates the maximum projection of the rotor element 110 when in the second pivot position 110A, which is also the maximum projection of the rotor element 110 with respect to the payload envelope PE, i.e., the part of the CMG 100 that projects beyond the predetermined geometrical boundary is at a maximum.

In position PS2, the outer surface 168 of CMG 100 is displaced away from the respective portion PE2 of the payload envelope as follows. In the respective first spatial configuration all of the CMG is within the payload envelope PE, while in the respective second spatial configuration, indicated by the dotted line SC2-2, indicates the maximum projection of the rotor element 110 when in the second pivot position 110A. In contrast with position PS1 part P' of this maximum projection of the rotor element 110 is within the payload envelope PE, and part P''' is projecting outside of the payload envelope PE.

Position PS3 is similar to PS2, the main difference being that external surface 168 of the respective CMG 100 is at an angle to the respective portion PE3 of the payload envelope PE, and the respective second spatial configuration, indicated by the dotted line SC2-3, indicates the maximum projection of the rotor element 110 when in the second pivot position 110A.

In position PS4, the outer surface 168 of CMG 100 is further displaced away from the respective portion PE2 of the payload envelope so that both in the respective first spatial configuration, and in the respective second spatial configuration, all of the CMG is within the payload envelope PE. Thus, in the respective second spatial configuration, indicated by the dotted line SC2-4, the maximum projection of the rotor element 110 when in the second pivot position 110A is still within the payload envelope PE, and no part is projecting outside of the payload envelope PE.

In each of positions PS1 to PS4, the respective maximum projections of the rotor element 110 when in the second pivot position 110A is illustrated in FIG. 2 as a rectangular doted line for illustrative purposes only. The actual geometric form of these projections can of course depend on the particular geometric form of the various components of the respective CMG, for example the rotor element thereof.

The aforesaid particularly compact configuration of at least the above example of CMG 100 selectively allows the CMG 100 to be located on a vehicle (for example vehicle 200) such to enable maximizing use of the available volume defined by the payload envelope PE, for example at locations PE1, PE2, PE3. For example, the CMG 100 can be designed to maximize use of this available volume by having a larger rotor element 110 than would be possible if all of the CMG 100 would be required to be within the payload envelope PE even when at the second pivot position 110A, and no projection of the rotor assembly beyond the payload envelope PE were to be allowed at the second pivot position 110A. Conversely, the CMG 100 can be designed having a rotor element 110 that is the same size as would be possible or required if all of the CMG 100 would be required to be within the payload envelope PE even when at the second pivot position, and no projection of the rotor assembly 190 beyond the payload envelope PE were to be allowed at the second pivot position; however, the CMG 100 can be closer to the payload envelope PE, thereby freeing up more space within the payload envelope PE.

In some alternative variations of the example of the CMG 100, the opening 167 is not covered, and operates as illustrated in FIGS. 1(*a*) and 1(*b*) without such a cover, even when the rotor assembly 190 is pivoted between the first spatial configuration and the second spatial configuration to provide desired control moments.

Figure 1C:
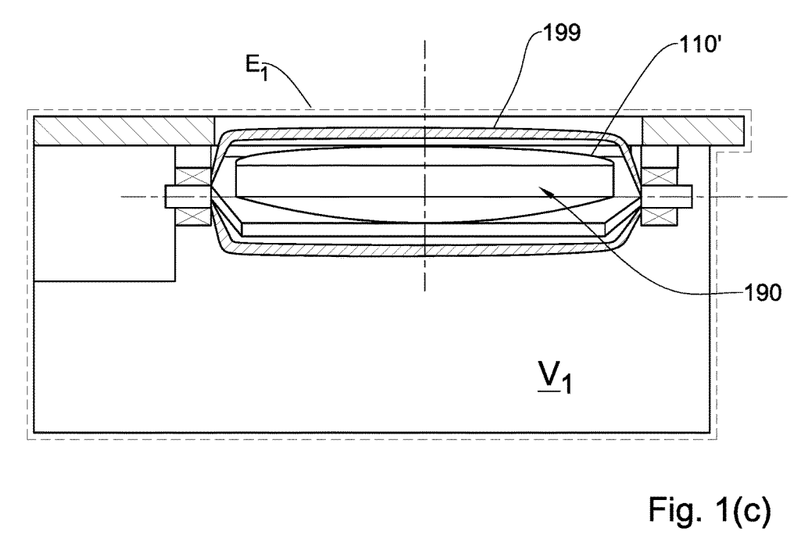
FIG. 1(c) illustrates an alternative variation of the example of FIG. 1 with a rotor assembly shroud and in a first spatial configuration.
Figure 1D:
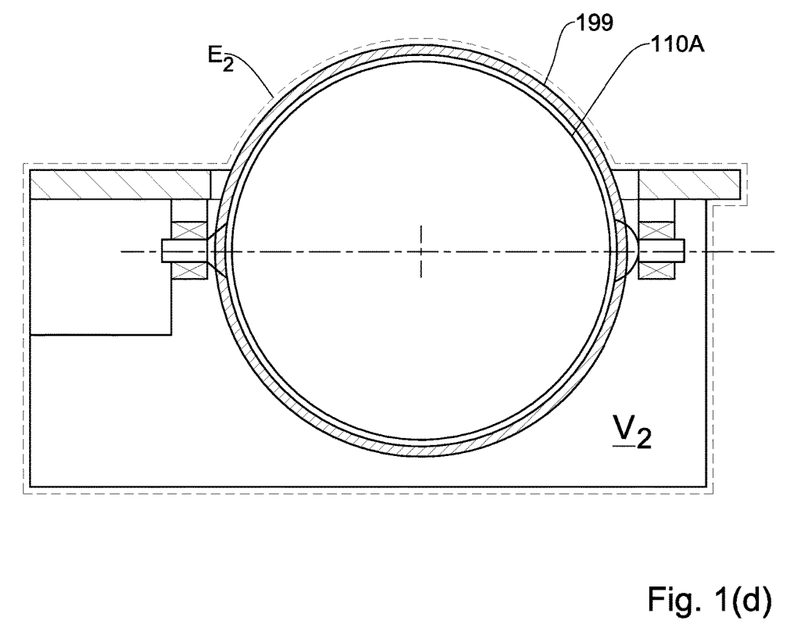
FIG. 1(d) illustrates an alternative variation of the example of FIG. 1 with a rotor assembly shroud and in a second spatial configuration FIG. 2 schematically illustrates in cross-sectional side view an example of a vehicle comprising a plurality of control moment gyroscope according to an aspect to the presently disclosed subject matter.

Optionally, and as illustrated in FIGS. 1(*c*) and 1(*d*), the CMG 100 can be provided with a sheath or shroud 199 that encloses the rotor assembly 190. The sheath or shroud 199 provides a measure of protection to the rotor assembly 190 from the environment outside thereof. The shroud 199 thus pivots together with the rotor assembly 190 between the first pivot position 110' and the second pivot position 110A.

Figure 3A:
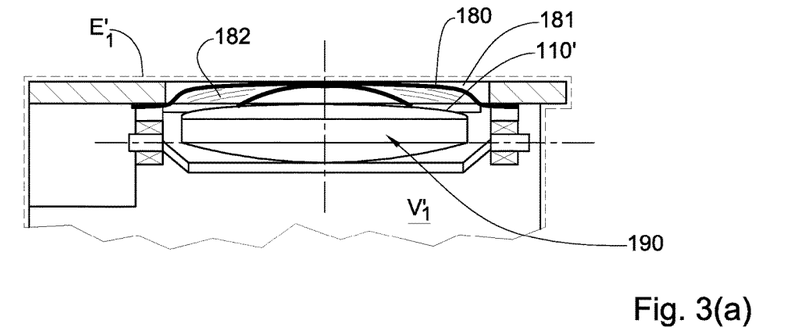
Figure 3B:
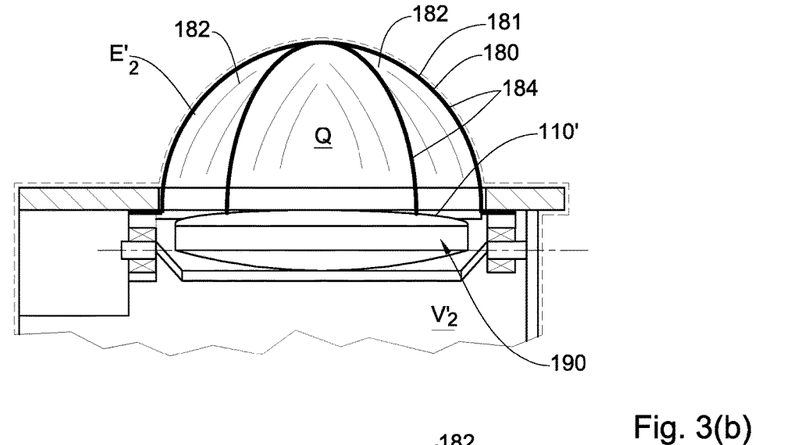
Figure 3C:
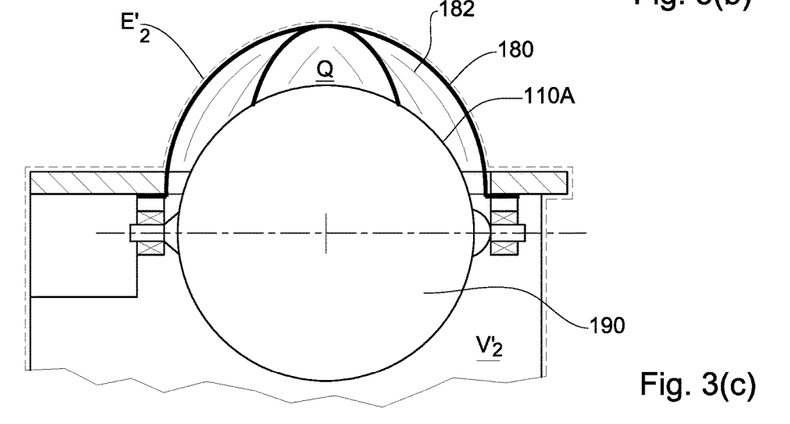

Nevertheless, in the example illustrated in FIG. 1, and referring also to FIGS. 3(*a*) to 3(*c*), the CMG 100 further comprises a cover 180, and the CMG 100 can optionally include or omit the aforesaid shroud 199 for enclosing the rotor assembly 190. The cover 180 has a deployed configuration and an undeployed configuration. Referring to FIG. 3(*a*), in the undeployed configuration, the cover 180 does not project outside beyond the opening 167, while in the deployed configuration illustrated in FIGS. 3(*b*) and 3(*c*), the cover 180 projects outside beyond the opening 167, thereby defining an inner space Q. The inner space Q is sufficient for allowing the rotor assembly 190 to pivot at least between the aforesaid first pivot position and the aforesaid second pivot position without fouling or making other adverse physical contact between the rotor element 110 and/or gimbal system 140 (or any other part of the rotor assembly 190) and the cover 180.

Thus, in the second spatial configuration the cover 180 is in the deployed configuration, while in the first spatial configuration the cover 180 can be undeployed or deployed. In operation of the CMG 100, and once the cover 180 has been deployed (for example once the vehicle is free of the payload envelope), the rotor assembly 190 can pivot between the first pivot position 110' and the second pivot position 110A, and the cover 180 remains in the deployed configuration. In alternative variations of this example, the cover 180 can be configured for switching between the undeployed configuration and the deployed configuration in synchronicity with the rotor assembly 190 pivoting between the first pivot position 110' and the second pivot position 110A, even during operation of the CMG 100, taking care that the rotor assembly 190 does not contact or otherwise fouls with the cover 180.

Referring to FIG. 3(*a*), when the rotor assembly 190 is in the aforesaid first pivot position 110', the CMG 100 adopts the first spatial configuration, occupying first volume V1' enclosed by first external envelope E1' which includes an outside 181 of the undeployed cover 180. Referring to FIG. 3(*b*), the cover 180 can be selectively deployed when required or desired, particularly when the constraint regarding the payload envelope PE is removed. The CMG 100 is then free to adopt the second spatial configuration, occupying second volume V2' enclosed by second external envelope E2' which now includes the outside 181 of the deployed cover 180. Thus, volume V2' enclosed by external envelope E2' includes inner space Q. Referring to FIG. 3(*c*), the rotor assembly 190 can now be rotated to any desired pivot position, including the aforesaid second pivot position 110A, since in the second spatial configuration, second volume V2' enclosed by second external envelope E2' is sufficient to allow full pivoting of the rotor assembly 190.

In this example, cover 180 comprises a flexible skin 182 supported by ribs 184. The skin 182 provides a measure of protection to the inner space Q from the environment outside thereof. In this example, the skin 182 is made from or is covered with a material providing thermal insulation and/or mechanical protection to inner space Q particularly from electromagnetic energy and from micro meteorite impact, respectively, in a vacuum environment such as outer space, for example. The ribs 184 are configured to provide an outwardly projecting shape, for example a convex shape, for example a hemispherical shape, to the skin 182 when the cover 180 is in the deployed configuration, while allowing the skin to adopt a more compact form when the cover 180 is in the undeployed configuration. Thus, the ribs 184 can be in the form of resilient struts that are biased to provide the aforesaid projecting shape when free, and can be selectively elastically deformed to provide the compact form by means of mechanical restrainers (not shown) for example, that can be removed when it is desired for the cover 180 to adopt the deployed configuration.

Alternatively, the ribs 184 can be in the form of articulated struts that are configured to provide the aforesaid compact form when articulated in one direction, and can be selectively articulated in the opposed direction to provide the aforesaid projecting shape by means of a suitable actuator, for example springs (not shown).

Alternatively, for example, the ribs 184 can instead be in the form of inflatable tubes that can be selectively inflated to provide a rigid or semi rigid frame to provide the aforesaid projecting shape, and are initially in an un-inflated configuration to provide the compact form required for the first spatial configuration.

Alternatively, for example, the ribs 184 can instead be made from a memory alloy, for example as marketed under "Nitinol", and are initially in a stressed or elastically deformed configuration to provide the compact form required for the first spatial configuration, the memory shape characteristics allowing the ribs 184 to open out and provide the volume Q required for the second spatial configuration when released.

Alternatively, for example, the ribs 184 can be omitted, and instead the skin 182 has a resilience that is sufficient for elastically deforming into a deformed configuration to provide the compact form required for the first spatial configuration, the resilience allowing the skin 182 to open out and provide the volume Q required for the second spatial configuration when released.

Figure 4A:
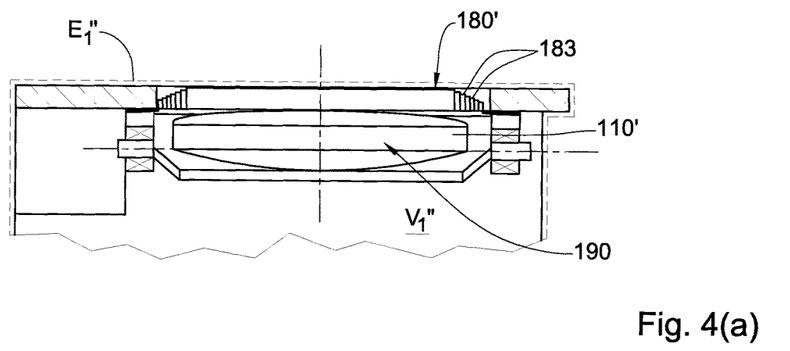
Figure 4B:
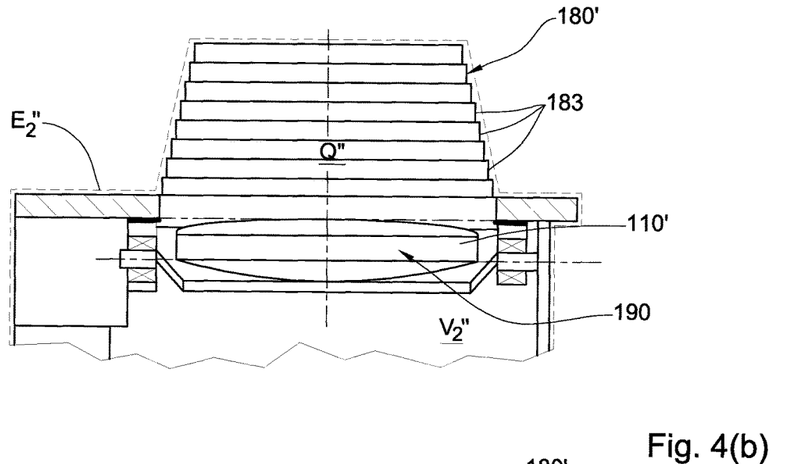
Figure 4C:
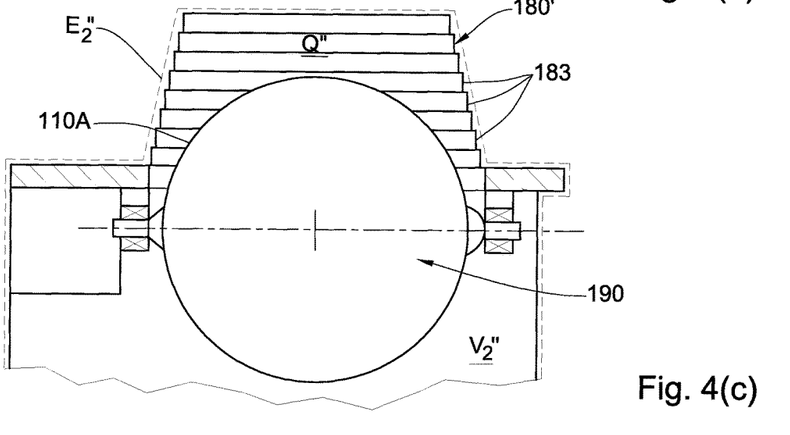

In another alternative variation of this example, and referring also to FIGS. 4(*a*) to 4(*c*), the CMG 100 further comprises a telescopic cover 180', instead of the cover 180 of the example of FIGS. 3(*a*) to 3(*c*), mutatis mutandis, also having a deployed configuration and an undeployed configuration.

Referring to FIG. 4(*a*), when the rotor assembly 190 is in the aforesaid first pivot position 110', the CMG 100 adopts the first spatial configuration, occupying first volume V1" enclosed by first external envelope E1" which includes an outside of the undeployed cover 180'. Referring to FIG. 4(*b*), the cover 180' can be selectively deployed when required or desired, particularly when the constraint regarding the payload envelope PE is removed. The CMG 100 is then free to adopt the second spatial configuration, occupying second volume V2" enclosed by second external envelope E2" which now includes the outside of the deployed cover 180'. Thus, volume V2" enclosed by external envelope E2" includes inner space Q". Referring to FIG. 4(*c*), the rotor assembly 190 can now be rotated to any desired pivot position, including the aforesaid second pivot position 110A, since in the second spatial configuration, second volume V2" enclosed by second external envelope E2" is sufficient to allow full pivoting of the rotor assembly 190.

In this example, cover 180' comprises a plurality of nested telescopic elements 183 defining an enclosed volume Q" when the telescopic elements 183 are telescopically extended as illustrated in FIGS. 4(*b*) and 4(*c*). The cover 180' provides a measure of protection to the inner space Q" from the environment outside thereof. In this example, the telescopic elements 183 are made from and/or are covered with a material providing thermal insulation and/or mechanical protection to inner space Q" particularly from electromagnetic energy and from micro meteorite impact, respectively, in a vacuum environment such as outer space, for example. The telescopic elements 183 are configured to provide a projecting shape, such as for example a pseudo-hemispherical shape, such as for example a top-hat shape, to the cover 180' when the telescopic elements 183 are telescopically extended and the cover 180' is in the deployed configuration. The telescopic elements 183 are also configured to allow the cover 180' to adopt a more compact form when the telescopic elements 183 are telescopically retracted and the cover 180 is in the undeployed configuration.

The cover 180' can be actuated to adopt the deployed configuration in any one of a number of different ways. For example, the telescopic elements 183 can be freely nested so that an outwardly directed force to the telescopic elements 183 pushes one telescopic elements 183 against the next providing the deployed configuration. Such a force can be provided by an acceleration of the CMG 100 in the required direction, for example providing a spin to the vehicle 200 to provide such a force as a centrifugal force. Alternatively such a force can be provided by having one or more resilient struts (not shown) connecting the interface 168 with the uppermost telescopic element 183. These struts can be biased to urge the telescopic elements 183 outwardly when free, and can be selectively elastically deformed to enable the telescopic elements 183 to adopt the compact form (by means of mechanical restrainers (not shown) for example, that can be removed when it is desired for the cover 180' to adopt the deployed configuration). Alternatively, the struts can be replaced with one or more inflatable tubes that can be selectively inflated to provide a rigid or semi rigid elongate structure extending away from the interface 168, to thereby urge telescopic elements 183 outwardly. On the other hand, the inflatable tubes are initially in an un-inflated configuration to allow the telescopic elements 183 to adopt the compact form required for the first spatial configuration.

The cover 180' operates in a similar manner to cover 180 as disclosed herein with respect to the CMG 100, mutatis mutandis.

In the above or other alternative variations of this example of CMG 100, the respective gimbal system 140 is instead configured for controllably tilting the rotor element 110 and thus the rotor assembly 190 about two mutually orthogonal gimbal axes, each orthogonal to the rotor spin axis RA, to enable tilting of the rotor about azimuth as well as elevation, independently of one another. In such a case, for example, the respective gimbal system is rotatably mounted to the casing via a first gimbal, to allow rotation or pivoting about a first gimbal axis GA, in a similar manner to that disclosed above with reference to FIG. 1 regarding gimbal axis GA, mutatis mutandis. However, the rotor element 110 is rotatably mounted to a second gimbal about rotor axis RA, rather than to the first gimbal. This second gimbal is rotatably mounted to the first gimbal about a second gimbal axis that is orthogonal to the first gimbal axis and to the rotor axis RA.

Referring again to FIG. 2, according to this aspect of the presently disclosed subject matter, there is also provided an attitude control system (ACS), generally designated with the reference numeral 300, comprising at least one CMG, at least one such CMG being any one of the examples of CMG 100 or alternative variations thereof as disclosed herein, mutatis mutandis. The ACS 300 can optionally comprise other components, for example one or more conventional control moment gyroscopes, for example located in locations in the vehicle unaffected by the geometric constraints of the payload envelope PE, for example location PS4 in FIG. 2, and/or reaction control thrusters.

For example, the ACS 300 can comprise a single CMG 100 or alternative variations thereof as disclosed herein, mutatis mutandis. At least one such application of ACS 300 can be, for example, in the context of a space vehicle in the form of a geosynchronous communication or surveillance satellite that requires to have smooth control of its line of sight (LOS), for example for a communications beam or imaging cameras, for example in the North-South directions with respect to the surface of the Earth. Such smooth control of the LOS can be provided by aligning the gimbal axis GA of the CMG 100 parallel to a generally East-West direction, i.e., orthogonal to the Earth axis, and controlling the pivot angle of the rotor assembly 190 according to the desired target on the Earth of the LOS.

For example, the ACS 300 can comprise two CMG's, each being a CMG 100 or alternative variations thereof as disclosed herein, mutatis mutandis. At least one such application of ACS 300 can be for example in the context of a space vehicle in the form of an attitude maneuvering satellite that requires maneuvering with respect to two orthogonal spatial axes. The two CMG's 100 are arranged with their respective gimbal axes GA parallel and laterally spaced relationship to one another in order to enable generation of angular momentum in any direction along a plane normal to the two gimbal axes GA, thereby providing two-dimensional maneuverability for the satellite. An alternative application of the ACS 300 can be for example in the context of a space vehicle in the form of a geosynchronous communication or surveillance satellite that requires to have smooth control of its line of sight (LOS) for communications beam or imaging cameras in the North-South directions with respect to the surface of the Earth, together with yaw angle control. The yaw angle is defined with respect to the particular Nadir of the satellite, i.e., an imaginary axis joining the satellite to the center of the Earth. One gimbal axis GA is aligned parallel to a generally East-West direction, i.e., orthogonal to the Earth axis, to provide the required smooth control of the LOS, by controlling the pivot angle of the respective rotor assembly 190 according to the desired target on the Earth of the LOS; the other gimbal axis GA is aligned along the Nadir direction, and by controlling the pivot angle of the respective rotor assembly 190 the yaw angle of the satellite can be changes as desired. Another alternative application of the ACS 300 can be for example for one CMG 100 to serve as a redundant or supplementary CMG of an ACS 300 that is configured to operate with a single CMG.

For example, the ACS 300 can comprise three CMG's, each being CMG 100 or alternative variations thereof as disclosed herein, mutatis mutandis. At least one such application of ACS 300 can be for example in the context of a space vehicle in the form of an attitude maneuvering satellite that requires maneuvering with respect to three orthogonal spatial axes. The three CMGs 100 can be provided in any suitable configuration that enables generation of angular momentum in any direction along three mutually orthogonal axes. For example, the gimbal axes GA of the three CMGs 100 can be aligned each one along a different one of three orthogonal axes, though many other spatial arrangements of the gimbal axes are possible. Another alternative application of the ACS 300 can be for example for one CMG 100 to serve as a redundant or supplementary CMG of an ACS 300 that is configured to operate with a two CMG's. Another alternative application of the ACS 300 can be for example for two CMG 100's to each serve as a redundant or supplementary CMG of an ACS 300 that is configured to operate with a single CMG.

For example, the ACS 300 can comprise four or more CMG's, each being CMG 100 or alternative variations thereof as disclosed herein, mutatis mutandis. For example, the four CMG's can adopt the so-called pyramid configuration. In at least one such application of ACS 300, three of the CMG's 100 are used for providing maneuvering with respect to three orthogonal spatial axes, while the one or more additional CMG's are provided to serve as redundant or supplementary CMG.

In the above examples of the ACS 300, each respective pair of CMG's 100 for example can be replaced with a single CMG 100 in which the gimbal system comprises two orthogonal gimbal axes, mutatis mutandis.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes can be made therein without departing from the spirit of the presently disclosed subject matter.

The invention claimed is:

1. A control moment gyroscope (CMG) configured for selectively and alternately providing a first spatial configuration and a second spatial configuration at least during operation of the CMG, the CMG comprising:
a variable external envelope enclosing a variable volume;
wherein in said first spatial configuration, said variable volume is smaller than in said second spatial configuration;
wherein in said first spatial configuration, no part of said CMG projects beyond a predetermined geometrical boundary;
wherein in said second spatial configuration, a portion of said CMG projects beyond said predetermined geometrical boundary; and
a cover configured for selectively providing each one of an undeployed configuration and a deployed configuration, wherein in said first spatial configuration said cover is in the undeployed configuration, and wherein in said second spatial configuration said cover is in the deployed configuration.

2. The vehicle according to claim 1, wherein said cover comprises any one of:
a flexible skin and a rib structure, wherein said rib structure is configured for changing from a compact form to a projecting form, to enable the cover to selectively adopt said deployed configuration and said undeployed configuration; or
a plurality of nested telescopic elements configured for telescopically extending to a projecting form and for telescopically retracting to provide a compact form, to enable the cover to selectively adopt said deployed configuration and said undeployed configuration.

3. The vehicle according to claim 1, wherein said cover is configured for at least one of thermally protecting said CMG or part thereof, mechanically protecting said CMG or part thereof, or remaining locked in said deployed configuration after deployment from said undeployed configuration.

4. The CMG according to claim 1, wherein said CMG is configured to be installed in a vehicle, wherein said predetermined geometrical boundary is a vehicle external geometrical boundary of the vehicle, wherein in said first spatial configuration said rotor assembly is inwards of said vehicle external geometrical boundary, and wherein in said second spatial configuration at least a part of said rotor assembly can project outwards beyond said vehicle external geometrical boundary.

5. The CMG according to claim 4, wherein said vehicle external geometrical boundary is a payload envelope associated with the vehicle.

6. An attitude control system (ACS), comprising:
at least one CMG, wherein said at least one CMG includes the CMG as defined in claim 1.

7. The ACS according to claim 6, further comprising one of said CMG configured for providing smooth control of a line of sight (LOS) of a space vehicle with respect to the surface of the Earth.

8. The ACS according to claim 6, further comprising two of said CMGs configured for providing attitude maneuvering for a space vehicle with respect to two orthogonal spatial axes.

9. The ACS according to claim 6, further comprising three of said CMGs configured for providing attitude maneuvering for a space vehicle with respect to three orthogonal spatial axes.

10. A vehicle comprising the ACS as defined in claim 6.

11. The vehicle according to claim 10, further comprising a vehicle external configuration optimized for being enclosed within a respective payload envelope, wherein in said first spatial configuration the respective said one or more CMG are enclosed within said payload envelope, and wherein in said second spatial configuration parts of one or more of the respective said one or more CMG project outside of said payload envelope.

12. A vehicle, comprising:
a vehicle external geometrical envelope; and
at least one control moment gyroscope (CMG) configured for selectively and alternately providing a first spatial configuration and a second spatial configuration at least during operation of the at least one CMG, the at least one CMG including a variable CMG external envelope enclosing a variable volume;

wherein in said first spatial configuration, said variable volume is smaller than in said second spatial configuration;

wherein in said first spatial configuration, no part of said at least one CMG projects beyond said vehicle external geometrical envelope; and wherein in said second spatial configuration, a portion of said at least one CMG projects beyond said vehicle external geometrical envelope.

13. The vehicle according to claim 12, further comprising a rotor assembly pivotably mounted to a housing defining a vehicle interface, wherein in said first spatial configuration said rotor assembly is inwards of said vehicle interface, and wherein in said second spatial configuration at least a part of said rotor assembly projects outwards of said vehicle interface.

14. The vehicle according to claim 13, wherein said rotor assembly includes a rotor element rotatably mounted about a spin axis to a first gimbal, wherein said first gimbal is rotatably mounted to a second gimbal about a first gimbal axis, and wherein said second gimbal is rotatably mounted to said housing for selective controlled rotation of the rotor assembly about a second gimbal axis with respect to said housing, for selective controlled rotation of the rotor assembly about each one of said first gimbal axis and said second axis with respect to said housing.

15. The vehicle according to claim 13, wherein said rotor assembly includes a rotor element rotatably mounted about a spin axis to a gimbal, wherein said gimbal is rotatably mounted to said housing for selective controlled rotation of the rotor assembly about a gimbal axis with respect to said housing, and wherein said gimbal axis is orthogonal to said spin axis.

16. The vehicle according to claim 15, further comprising a shroud for said rotor assembly and configured for pivoting with said rotor assembly about said gimbal axis.

17. The vehicle according to claim 16, wherein said shroud is configured for providing at least one of thermal protection or mechanical protection to said rotor assembly.

18. A method for controlling a spatial attitude of a vehicle, the method comprising providing the vehicle as defined in claim 12; and operating at least one said CMG between a respective said first spatial configuration and a respective said second spatial configuration.

19. The method according to claim 18, wherein the at least one CMG is operated to provide at least one of:

smooth control of a line of sight (LOS) of the vehicle with respect to the surface of the Earth;

attitude maneuvering for the vehicle with respect to two orthogonal spatial axes; or attitude maneuvering for the vehicle with respect to three orthogonal spatial axes.

* * * * *